July 26, 1932.  J. ROBINSON  1,868,916
AUTOMATIC TRAIN PIPE COUPLING
Original Filed May 24, 1926  3 Sheets-Sheet 1
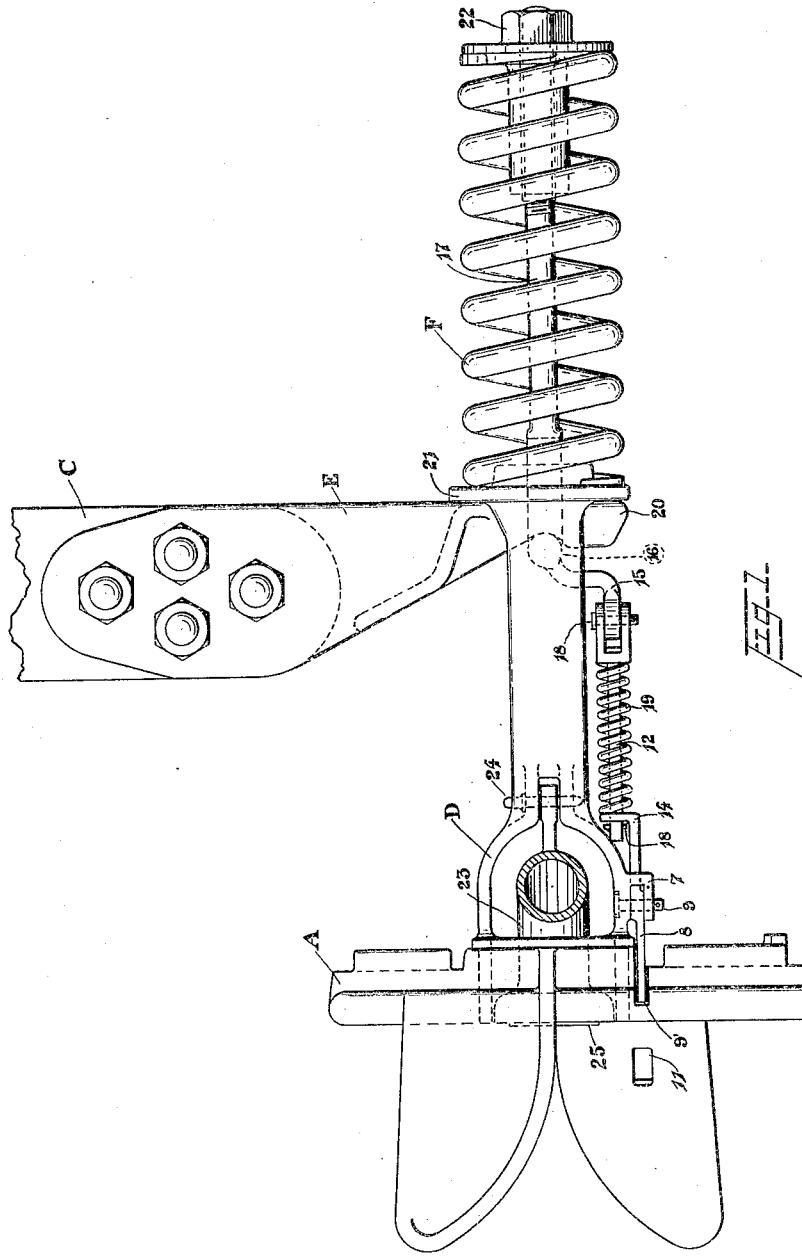
INVENTOR.
Joseph Robinson,
BY
Watson, Coit, Morse & Grindle,
ATTORNEY.

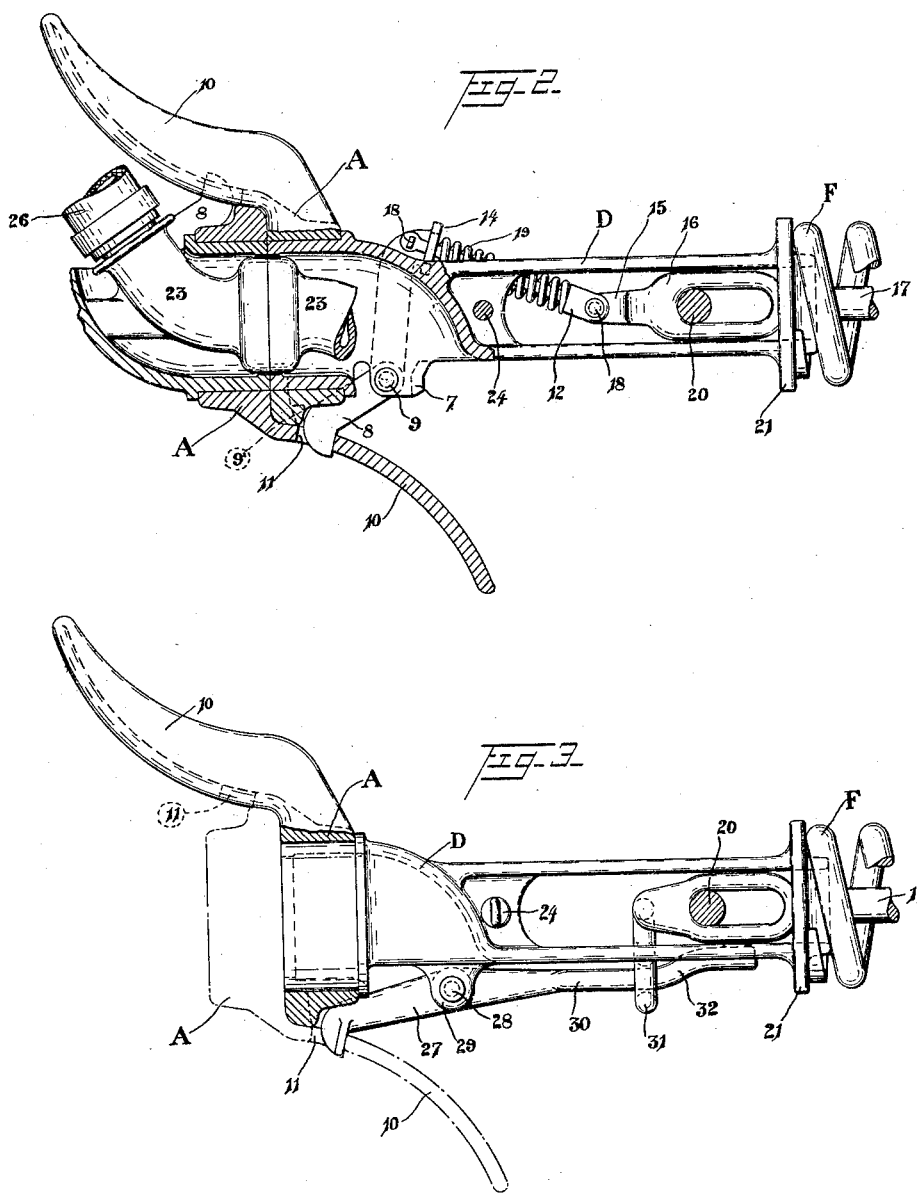

July 26, 1932. J. ROBINSON 1,868,916
AUTOMATIC TRAIN PIPE COUPLING
Original Filed May 24, 1926   3 Sheets-Sheet 3
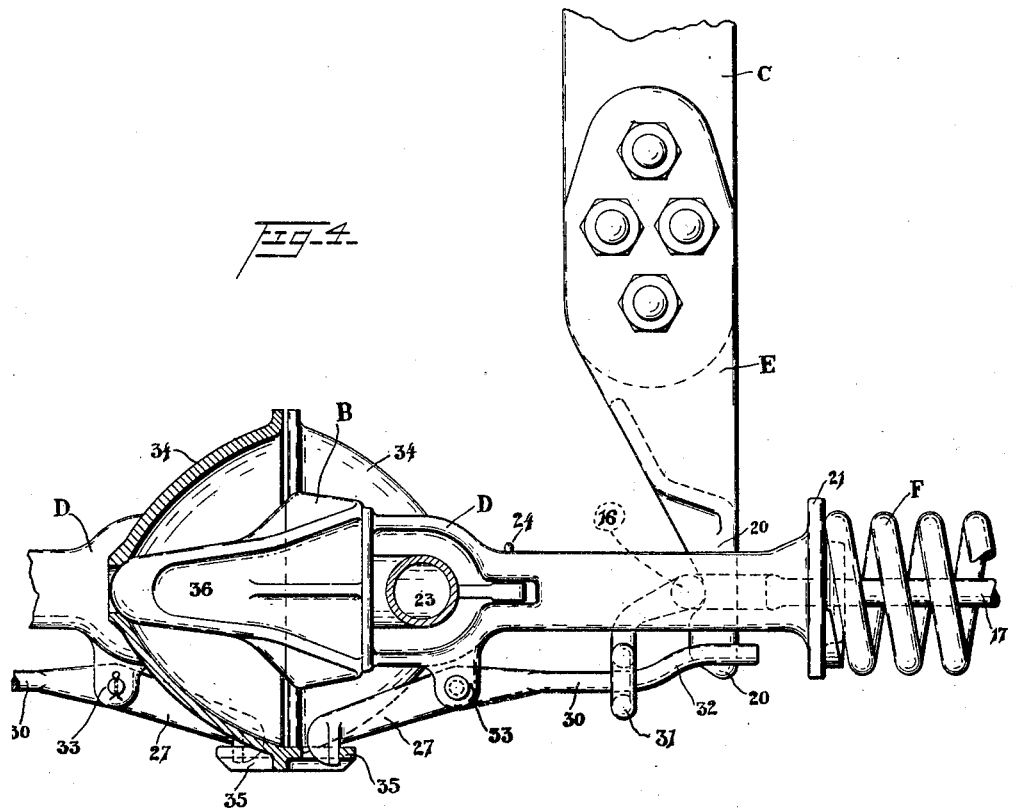
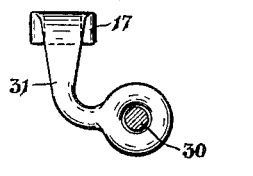
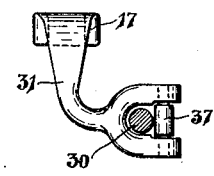
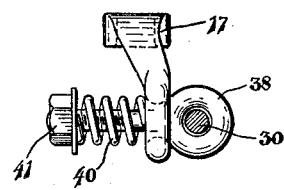
INVENTOR.
Joseph Robinson,
BY
Watson, Coit, Morse & Grindle,
ATTORNEY.

Patented July 26, 1932

1,868,916

UNITED STATES PATENT OFFICE

JOSEPH ROBINSON, OF NEW YORK, N. Y.

AUTOMATIC TRAIN PIPE COUPLING

Application filed May 24, 1926, Serial No. 111,415. Renewed March 15, 1930.

The automatic train pipe coupling comprising the present invention is adapted for use in rigidly locking mating coupling heads upon adjacent car parts together, the car parts being held in position by a coupling device of any desired construction. One of the objects of the present invention is to provide an automatic pipe coupling which, when the cars are brought together and coupled, will automatically couple the train pipe connections together in locked position, and when the adjacent cars are uncoupled, and the main coupling device parts separated, the train pipe connections will automatically become uncoupled.

In the drawings—Figure 1 is a side elevation of my invention,

Figure 2 is a sectional plan view of my improved locking means showing a pair of mated coupling heads in the coupled position, Figure 3 is a modification, in the locked position, of the construction shown in Figures 1 and 2 with the conduit 23 omitted, Figure 4 is a side elevation of the construction shown in Figure 3 as it would be applied to the pin and funnel coupling head B hereinafter mentioned. In this view the parts are also in the coupled locked position, Figure 5 is a front view of the projection or goose neck 27 illustrated in Figures 3 and 4, Figure 6 is a front view of this member 27 modified, and Figure 7 is a further modification thereof shown also in front view.

My invention is adaptable to any suitable type of coupling head A. In Figures 1 to 3 inclusive of the drawings, I illustrate it as used with the well known wing type of coupling head shown in my co-pending application, Serial #488,373, filed July 29th 1921, and in Figure 4 I illustrate it as used with a pin and funnel coupling head B of the general construction shown in my co-pending application, Serial #537,827, filed February 20th 1922, with the ports 2 and 4 illustrated in that application omitted.

The means by which the heads A and B are supported from the car coupler lug C for free universal movement, is substantially the same as that shown and described in my above first mentioned co-pending application. I provide near the forward end of the member D, and preferably on its lower side, a bearing 7 on which a suitable latch 8 is pivotally mounted, as by a pin 9, with its forward end projecting into an opening or groove 9', Figures 1 and 2, in the coupling head A. The guiding member 10 of the mating coupling head is provided with a suitably located and suitably formed opening or recess 11 into which the forward end of the latch 8 is horizontally swung as the coupling heads move to the coupled position shown in Figure 2. The means for throwing or actuating the latch 8 consists, in the constructions shown in Figures 1 and 2, of a link or rod 12 which flexibly connects the rear end or shank 14 of the latch with the projection or goose neck 15 formed on the forward end 16 of the tie rod 17. The rod or link 12 is tied in its flexible relation to the latch 8 and to the tie rod 17 by suitable pins, or other satisfactory means, 18. A coil spring 19, of the required tension, is placed between the shank 14 and the goose neck 15, and surrounds the rod 12. This arrangement provides flexible or resilient means for actuating the lock 8 and for automatically compensating for any wear or disalignment, which may develop between the contacting points of the latch 8 and the guide or wing 10. It is necessary, of course, that the distance from the pivotal point of the latch 8 to the rear end of the shank 14, shall be sufficient to give the required firm locking effect under pressure of the spring 19.

The bracket E is suitably connected to the lug C of the car coupler (not shown) and extends downwardly into the hollow of the member D. The lower end of the bracket terminates in an elongated anchor device or lug 20 which extends through an elongated opening in the forward end of the tie rod 17. The tie rod is mounted for rocking movement in a seat on the front face of the anchor device 20, as shown especially in Figure 1, and these parts, at their point of contact, flare in opposite directions. The member D has a perforated flange 21 through which, from the rear, the tie rod 17 extends. A coiled buffer or supporting spring F for yieldingly supporting the coupling head A and the member D, surrounds the tie rod and is confined between the flange 21 of the member D and the rear end of the tie rod, by a suitable stop, or abutment 22.

It will be noted that my improved locking means extends from the coupling head A to the rear of the supporting spring F, and that it moves in unison with the tie rod 17 to all the positions assumed by the latter.

The hollow forward end of the member D carries a suitable fitting or fluid conduit 23 shown best in Figure 2. The conduit is removably held in place by a suitable pin or other desirable means 24 which may be readily lifted by hand to permit the conduit to be removed from the coupled locked position, and re-established to that position, while the automatically actuated lock 8 remains in the locked position. The fitting 23 carries a gasket 25 and is adapted to abut a mating conduit or fitting in an opposing coupling head, as shown in Figure 2. The usual train pipe hose 26, also best shown in Figure 2, is connected to the rear end of the fitting 23.

In the modification illustrated in Figure 3, a latch 27 is pivoted, as by a pin 28, on a suitable bearing 29, and engages the wing 10, in the manner hereinbefore described, but the shank 30 thereof extends rearwardly and passes through an opening in a laterally extending goose neck or projection 31 formed on the forward end of the tie rod 17, which tie rod is, in all other respects, the same as the tie rod shown in Figures 1 and 2. The shank 30 is cammed at 32 to, in combination with the projection 31, rotate the latch 27, in the horizontal plane, into and out of the service position as the coupling heads couple and uncouple. This modification provides a simple rugged construction, which is positive and efficient in operation.

In Figure 4, the modified form of my improved lock illustrated in Figure 3, is shown applied to a pin and funnel coupling head B hereinbefore referred to. In this embodiment of my invention the latch 27 shown in Figure 3 is suitably pivoted at 33 for rotation in the vertical plane, the guide or funnel 34 of the coupling head B being provided with a forwardly extending perforated projection or tongue 35 into and out of which the forward end of the latch 27 is swung through the medium of the cam 32 and goose neck 31 as the coupling heads couple and uncouple. It will be observed that in this embodiment of my invention the latch 27 operates below the guide pin 36 of the head B and that it does not project in advance of the coupling face of the head.

An anti-friction device or roller 37, Figure 6, may be employed to minimize wear between the shanks 30 and the goose necks 31 if desired.

If it is desired to throw the latch 27, Figures 3 and 4, resiliently, it is merely necessary to slidably mount on the forward end of the tie rod 17 a finger 38, Figure 7, and back it up with a suitable spring 40 held in place by a nut or other means 41. With this arrangement the latch 27 should not be thrown all the way into the opening 11 in the wing 10. Room should be left for further inward movement of the latch, under the pressure of the spring 40, to compensate for wear on the inter-locking parts.

It will be understood that the forward end of the latch 27, Figures 1 and 2, is preferably so located that it swings under the shank of the coupling head A, as does the latch 8, shown in Figures 1 and 2.

The modifications of my invention shown in Figures 3, 4, 5, 6 and 7 are not specifically claimed in this application, but the right to claim them in an application or applications divisional hereof is reserved.

What I claim is:

1. An automatic train pipe coupling comprising in combination, a coupling head, a bracket for supporting the head, a member extending from the head past said bracket, a spring for yieldingly projecting the head, a tie rod for tying said spring to the bracket at the rear of the latter, and means for locking said coupling head to a mating head, said means including a latch having a portion adapted to engage said tie rod whereby the latch is thrown into and out of the locked position as said coupling head moves to the coupled and uncoupled position.

2. An automatic train pipe coupling comprising in combination, a coupling head, a bracket, a member extending from the coupling head past said bracket, a spring at the rear of said bracket for supporting said head, a tie rod extending through the spring and mounted on the bracket for rocking movement thereon, and a lock actuated from said tie rod for locking said coupling head to a mating head.

3. An automatic train pipe coupling comprising in combination, a coupling head, a bracket, a member extending from the head past the bracket, a spring in the rear of the bracket for supporting the head, a tie rod by which said spring is anchored to the bracket, and a lock having pivotal movement relative to said coupling head for locking the head to a mating head, said lock being actuated from said tie rod upon movement of the coupling head.

4. An automatic train pipe coupling comprising in combination, a coupling head, a bracket, a member extending from the head rearwardly past said bracket, a spring at the rear of the bracket for supporting the head, a latch pivotally mounted on said member, a tie rod for said spring, and means on the tie rod and moving in unison therewith to all the positions assumed by the tie rod for throwing said latch into and out of engagement with a mating head during coupling and uncoupling of mating heads in service.

5. An automatic train pipe coupling comprising in combination, a coupling head, a bracket, a member extending from the head rearwardly and spanning said bracket, a spring yieldingly holding said member at the limit of its forward movement, a tie rod extending into said member and embracing said bracket for rocking movement thereon, a spring surrounding the tie rod at the rear of the bracket for yieldingly sustaining said coupling head, and a pivoted latch adapted to be thrown into and out of engagement with a mating coupling head by said tie rod upon pre-determined movement of the coupling head.

6. An automatic train pipe coupling comprising in combination, a coupling head, a bracket, a member extending rearwardly from the head and spanning said bracket and having a vertically disposed perforated projection normally engaging the rear side of the bracket, a spring yieldingly holding said projection against the bracket, a tie rod extending through said perforation and embracing said bracket for rocking movement thereon, a spring surrounding the tie rod at the rear of the bracket for yieldingly sustaining said coupling head, and a pivoted latch adapted to be thrown into and out of engagement with a mating coupling head by said tie rod upon pre-determined movement of the coupling head, said latch being pivoted to said member for movement in a horizontal plane.

7. An automatic train pipe coupling comprising in combination, a coupling head, a bracket, a member extending from the head rearwardly past the bracket, a spring at the rear of the bracket for supporting the head, a tie rod mounted on the bracket for universal movement and serving to anchor said spring to the bracket, a counterpart coupling head in engagement with the first mentioned head, said counterpart coupling head having a portion provided with an opening to receive a latch, and a latch pivotally mounted on said coupling head adjacent said opening, said latch being thrown into and out of said opening by said tie rod upon pre-determined movement of said coupling head.

8. An automatic train pipe coupling comprising in combination, a coupling head, a hollow member, the forward end of which is mounted in said coupling head, a bracket extending from above the member downwardly into the hollow thereof, a spring at the rear of the bracket, a tie rod extending through the spring and anchored to the bracket for rocking movement with respect thereto, a fluid conduit in the forward end of said hollow member, and locking means actuated by said tie rod upon pre-determined movement of said coupling head for preventing undesired relative movement between said fluid conduit and a similar conduit in a mating coupling head when companion coupling heads are coupled up in service.

9. An automatic train pipe coupling comprising in combination, a coupling head, a member extending rearwardly from the head, a bracket between the rear end of said member and the head, a spring acting against the rear end of said member for supporting said head, a tie rod pivotally mounted on the bracket for anchoring the spring thereto, a latch for locking said coupling head to a mating head, means connected to said latch and said tie rod for actuating the latch, and resilient means associated with said connecting means and constantly pressing the latch into the locked position.

10. An automatic train pipe coupling comprising in combination, a coupling head, a bracket, a member extending rearwardly from said head past the bracket, a tie rod pivotally mounted on the lower end of the bracket and extending rearwardly therefrom, a spring surrounding the tie rod and acting against said member to yieldingly support said coupling head, a latch connected with and actuated by said tie rod for locking said coupling head to a mating head, and means for compensating for wear between said latch and said mating head at their point of contact.

11. An automatic train pipe coupling comprising in combination a coupling head, a bracket, a member extending from the head past said bracket, a spring for supporting the head, a latch carried by said member for locking the head to a mating head, a support for said spring mounted on and extending rearwardly of said bracket for rocking movement thereon, and means carried by said support for actuating said latch.

12. An automatic train pipe coupling comprising in combination, a coupling head, a member extending rearwardly from the head, a bracket, a tie rod extending through the rear end of said member and pivotally mounted on the front face of the bracket, a spring supported by the tie rod for yieldingly sustaining said coupling head, a latch for locking the coupling head to a mating head, and a projection on the tie rod for throwing said latch into and out of the service position.

13. An automatic train pipe coupling comprising in combination, a coupling head, a bracket, a member connecting the head and the bracket, a tie rod pivoted upon the front face of the bracket and extending to the rear of the bracket, a spring anchored to the bracket by said tie rod, a latch for locking the coupling head to a mating head, a perforated projection on the forward end of said tie rod, and means in the perforation for throwing said latch into and out of the service position.

14. An automatic train pipe coupling comprising in combination, a coupling head, a member extending from the head rearwardly, a bracket against which the member bears, a spring in the rear of the bracket for supporting the head, a tie rod on which such spring is mounted, and means for locking the head to a mating head, said means extending from a point near the rear side of said coupling head rearwardly and cooperating with said tie rod.

In testimony whereof I hereunto affix my signature.

JOSEPH ROBINSON.